(12) United States Patent
Wang et al.

(10) Patent No.: US 10,839,799 B2
(45) Date of Patent: Nov. 17, 2020

(54) DEVELOPER VOICE ACTIONS SYSTEM

(71) Applicant: GOOGLE LLC, Mountain View, CA (US)

(72) Inventors: Bo Wang, San Jose, CA (US); Sunil Vemuri, Pleasanton, CA (US); Nitin Mangesh Shetti, Sunnyvale, CA (US); Pravir Kumar Gupta, Los Altos, CA (US); Scott B Huffman, Portola Valley, CA (US); Javier Alejandro Rey, San Francisco, CA (US); Jeffrey A. Boortz, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/987,509

(22) Filed: May 23, 2018

(65) Prior Publication Data
US 2018/0374480 A1    Dec. 27, 2018

Related U.S. Application Data

(63) Continuation of application No. 15/258,084, filed on Sep. 7, 2016, now Pat. No. 10,008,203, which is a
(Continued)

(51) Int. Cl.
*G10L 15/22* (2006.01)
*G06F 3/16* (2006.01)
(Continued)

(52) U.S. Cl.
CPC ............. *G10L 15/22* (2013.01); *G06F 3/167* (2013.01); *G10L 15/1815* (2013.01);
(Continued)

(58) Field of Classification Search
CPC ............ G10L 15/26; G10L 15/15–265; G10L 15/265
(Continued)

(56) References Cited

U.S. PATENT DOCUMENTS

| 5,732,395 A | 3/1998 | Alexander Silverman |
| 6,363,348 B1 | 3/2002 | Besling et al. |

(Continued)

FOREIGN PATENT DOCUMENTS

| CN | 103035240 | 4/2013 |
| CN | 103039064 | 4/2013 |

(Continued)

OTHER PUBLICATIONS

The Korean Intellectual Property Office; Office Action issued for Application No. 10-2017-7028031 dated Feb. 21, 2019.
(Continued)

*Primary Examiner* — Jakieda R Jackson
(74) *Attorney, Agent, or Firm* — Middleton Reutlinger

(57) ABSTRACT

Methods, systems, and apparatus for receiving data identifying an application and a voice command trigger term, validating the received data, inducting the received data to generate an intent that specifies the application, the voice command trigger term, and one or more other voice command trigger terms that are determined based at least on the voice command trigger term, and storing the intent at a contextual intent database, wherein the contextual intent database comprises one or more other intents.

11 Claims, 3 Drawing Sheets

Related U.S. Application Data continuation of application No. 14/693,330, filed on Apr. 22, 2015, now Pat. No. 9,472,196.

(51) Int. Cl.
  *G10L 15/18* (2013.01)
  *G10L 15/19* (2013.01)
  *G10L 15/08* (2006.01)
  *G10L 15/06* (2013.01)

(52) U.S. Cl.
  CPC ...... *G10L 15/19* (2013.01); *G10L 2015/0638* (2013.01); *G10L 2015/088* (2013.01); *G10L 2015/223* (2013.01)

(58) Field of Classification Search
  USPC .............................. 704/275, 235, 257
  See application file for complete search history.

(56) References Cited

U.S. PATENT DOCUMENTS

| | | | |
|---|---|---|---|
| 6,604,075 B1 | 8/2003 | Brown | |
| 6,748,361 B1 | 6/2004 | Comerford et al. | |
| 7,013,282 B2 | 3/2006 | Schrocter | |
| 7,363,228 B2 | 4/2008 | Wyss et al. | |
| 7,412,391 B2 | 8/2008 | Nakagawa et al. | |
| 7,877,258 B1 | 1/2011 | Chelba et al. | |
| 8,165,886 B1* | 4/2012 | Gagnon | G10L 15/19 704/275 |
| 8,219,407 B1* | 7/2012 | Roy | G10L 15/19 704/275 |
| 8,239,206 B1* | 8/2012 | LeBeau | H04M 1/271 704/275 |
| 8,239,239 B1* | 8/2012 | Malhotra | G06Q 10/06 705/7.27 |
| 8,253,566 B2* | 8/2012 | Ichikawa | B41J 2/17546 235/375 |
| 8,285,329 B1* | 10/2012 | Zhu | G06F 21/629 235/380 |
| 8,370,146 B1 | 2/2013 | Schalkwyk et al. | |
| 8,418,076 B2* | 4/2013 | Mail | G06F 3/038 715/767 |
| 8,532,675 B1 | 9/2013 | Pasquero et al. | |
| 8,682,661 B1 | 3/2014 | Schalkwyk et al. | |
| 8,731,939 B1 | 5/2014 | LeBeau et al. | |
| 8,818,994 B2* | 8/2014 | Kowalski | G06Q 10/00 707/722 |
| 8,881,269 B2* | 11/2014 | Fleizach | G06F 3/04883 726/19 |
| 8,902,184 B2* | 12/2014 | Rydenhag | G06F 3/04886 345/173 |
| 8,965,759 B2 | 2/2015 | Hershenhom | |
| 9,104,440 B2* | 8/2015 | Jarrett | G06F 3/04883 |
| 9,197,769 B2* | 11/2015 | Hasama | H04N 1/00413 |
| 9,472,196 B1 | 10/2016 | Wang et al. | |
| 9,570,077 B1 | 2/2017 | LeBeau et al. | |
| 10,249,296 B1* | 4/2019 | Mutagi | G10L 15/1822 |
| 2002/0007391 A1* | 1/2002 | Suzuki | H04L 67/06 709/203 |
| 2003/0014260 A1* | 1/2003 | Coffman | G10L 15/22 704/275 |
| 2003/0236664 A1 | 12/2003 | Sharma | |
| 2004/0260562 A1* | 12/2004 | Kujirai | G01C 21/3608 704/275 |
| 2005/0203740 A1* | 9/2005 | Chambers | 704/254 |
| 2006/0116880 A1* | 6/2006 | Gober | G10L 15/28 704/270 |
| 2007/0050191 A1 | 3/2007 | Weider et al. | |
| 2007/0094033 A1 | 4/2007 | Nagashima et al. | |
| 2007/0100636 A1 | 5/2007 | Hirota et al. | |
| 2008/0208585 A1 | 8/2008 | Ativanichayaphong et al. | |
| 2008/0270135 A1 | 10/2008 | Goel et al. | |
| 2008/0313302 A1* | 12/2008 | Heyworth | G06F 16/40 709/217 |
| 2009/0171659 A1 | 7/2009 | Pearce et al. | |
| 2009/0171663 A1 | 7/2009 | Badt et al. | |
| 2009/0171664 A1 | 7/2009 | Kennewick et al. | |
| 2009/0216538 A1 | 8/2009 | Weinberg et al. | |
| 2010/0223060 A1 | 9/2010 | Chang et al. | |
| 2010/0286985 A1 | 11/2010 | Kennewick et al. | |
| 2010/0312547 A1 | 12/2010 | Van Os et al. | |
| 2010/0312782 A1 | 12/2010 | Li et al. | |
| 2011/0106534 A1 | 5/2011 | LeBeau et al. | |
| 2011/0131045 A1 | 6/2011 | Cristo et al. | |
| 2011/0144980 A1 | 6/2011 | Rysenga | |
| 2011/0196668 A1 | 8/2011 | Shu et al. | |
| 2011/0223893 A1 | 9/2011 | Lau et al. | |
| 2011/0288859 A1 | 11/2011 | Taylor et al. | |
| 2012/0159382 A1* | 6/2012 | Matthews | G06F 3/04886 715/788 |
| 2012/0173244 A1 | 7/2012 | Kwak et al. | |
| 2012/0278722 A1* | 11/2012 | Raleigh | G06F 15/177 715/735 |
| 2013/0047198 A1* | 2/2013 | Srour | G06F 9/485 726/1 |
| 2013/0050263 A1* | 2/2013 | Khoe | G06F 3/0481 345/634 |
| 2013/0219333 A1* | 8/2013 | Palwe | H04M 1/72522 715/810 |
| 2013/0238326 A1 | 9/2013 | Kim et al. | |
| 2013/0263021 A1* | 10/2013 | Dunn | H04N 21/4532 715/756 |
| 2013/0346450 A1* | 12/2013 | Procopio | G06F 21/6218 707/783 |
| 2014/0093101 A1* | 4/2014 | Lee | G06F 16/68 381/107 |
| 2014/0195243 A1 | 7/2014 | Cha et al. | |
| 2014/0244259 A1 | 8/2014 | Rosario et al. | |
| 2014/0279233 A1 | 9/2014 | Lau et al. | |
| 2014/0298249 A1* | 10/2014 | Lee | G06F 9/451 715/781 |
| 2014/0324856 A1* | 10/2014 | Lahiani | G06Q 30/0631 707/736 |
| 2014/0343950 A1 | 11/2014 | Simpson et al. | |
| 2015/0019074 A1 | 1/2015 | Winter et al. | |
| 2015/0088523 A1* | 3/2015 | Schuster | G10L 15/22 704/275 |
| 2016/0034159 A1* | 2/2016 | Vranjes | G06F 3/04812 715/800 |
| 2016/0042748 A1* | 2/2016 | Jain | G10L 25/48 704/9 |
| 2016/0103793 A1* | 4/2016 | Fang | G06F 16/986 715/234 |
| 2016/0155443 A1* | 6/2016 | Khan | G06F 1/3203 704/275 |
| 2016/0162020 A1* | 6/2016 | Lehman | G06F 3/013 |
| 2016/0196820 A1* | 7/2016 | Williams | G10L 15/1822 704/244 |
| 2016/0314791 A1 | 10/2016 | Wang et al. | |

FOREIGN PATENT DOCUMENTS

| | | |
|---|---|---|
| CN | 103674012 | 3/2014 |
| CN | 103794214 | 5/2014 |
| JP | 2002258892 | 11/2002 |
| JP | 2005017974 | 1/2005 |
| JP | 2005242243 | 8/2005 |
| JP | 2006137366 | 1/2006 |
| JP | 2006208461 | 8/2006 |
| JP | 2008076811 | 4/2008 |
| JP | 2011503638 | 1/2011 |
| JP | 2014170185 | 9/2014 |
| JP | 2015011170 | 1/2015 |
| KR | 20100047719 | 5/2010 |
| KR | 2013136167 | 12/2013 |
| WO | 2015038435 | 3/2015 |
| WO | 2016171956 | 10/2016 |

(56) References Cited

OTHER PUBLICATIONS

Japanese Patent Office; Notice of Allowance issued for Application No. 2017-550871 dated May 7, 2019.

Korean Intellectual Property Office; Notice of Allowance issued in Application No. 10-2017-7028031 dated Jul. 22, 2019.

International Search Report and Written Opinion for PCT Patent Application No. PCTUS2016027113, 13 pages, dated Jul. 7, 2016.

International Preliminary Report on Patentability for PCT/US2016/027113, 11 pages, dated Nov. 2, 2017.

Hunt et al., Speech recognition Grammar Specification Version 1.0, Internet Citation, URL<http://www.w3.org/TR/speech-grammar/>, XP002405714, 77 pages, dated Mar. 16, 2004.

Taylor, P.A.; Concept-to-Speech Synthesis by Phonological Structure Matching, Center for Speech Technology Research, University of Edinburgh; The Royal Society, 14 pages, dated 2000.

Lumenvox; Grammars, http://www.lumenvox.com/pdf/grammars.pdf, 9 pages, retrieved Jul. 31, 2010.

Bulyko et al.; Web Resources for Language Modeling in Conversational Speech Recognition; ACM Trans on Speech and Language Processing, 25 pages Dec. 2007.

Non Final Office Action for JP Appl. No. 2017-550871, 9 pages, dated Aug. 16, 2018.

Korean Intellectual Property Office; Office Action issued in Application No. 10-2019-7031169 dated Dec. 16, 2019.

Chinese Patent Office; Office Action issued in Application No. 201680019717.8 dated Apr. 15, 2020. 12 Pages.

European Patent Office; Communication pursuant to Article 94(3) EPC issued in Application No. 16721548.2, dated Mar. 3, 2020.

India Intellectual Property Office; Office Action issued for Application No. 201747033604 dated Jul. 11, 2020. 7 pages.

Japanese Patent Office; Notice of Reasons for Rejection issue in Application No. 2019101151; 9 pages; dated Jul. 27, 2020.

* cited by examiner

DEVELOPER VOICE ACTIONS SYSTEM

CROSS-REFERENCE TO RELATED APPLICATION

This application is a continuation of, and claims priority to, U.S. application Ser. No. 15/258,084, filed Sep. 7, 2016, entitled "DEVELOPER VOICE ACTIONS SYSTEM", which is a continuation of U.S. application Ser. No. 14/693,330, filed Apr. 22, 2015, the contents of which are incorporated by reference herein in their entireties.

TECHNICAL FIELD

This specification relates to voice commands, and one particular implementation relates to configuring voice commands.

BACKGROUND

An activity defined in software can specify a task, where the activity is a class that controls the life cycle of the execution of the task. An intent is a passive data structure that can specify a particular activity and an application associated with the particular activity. The intent can be triggered by an application and can cause the activity specified by the intent to be performed on or by the target application specified by the intent.

SUMMARY

A passive data structure referred to as an intent can specify an application and an activity to be performed on or by the application, where the activity is a task that is executed on or by the application. The intent can specify one or more trigger phrases that can be used to trigger the intent, such that triggering of the intent causes performance of the activity by the specified application. For example, an intent can be associated with an application for a taxi service, and can specify one or more trigger phrases that operate as voice actions such that, when spoken by a user, detection of one of the trigger phrases triggers launching of the taxi service application. The intent can be triggered by an application or operating system other than the application specified by the intent, such that triggering of the application causes the specified activity to be performed on or by the particular application.

A service or tool offered by a host can enable an application developer to request new intents that specify a particular application that they are developing. Submissions for new intents can be in the form of a grammar, where the developer can submit a grammar to the service or tool and the service or tool can generate an intent for the particular application based on the grammar.

In some implementations, a grammar submitted by a developer can specify one or more of an application, a trigger phrase, an activity or compound activity, a context, or other information. The grammar is submitted by the developer and is received over a network by the developer voice action service or tool. The developer voice action service or tool can validate the grammar. For example, validation of the grammar can involve determining whether the trigger phrase is already associated with an intent for an operating system or another application, can determine whether the activity specified by the grammar can be performed by the specified application, can determine whether the trigger phrase meets certain criteria, can determine whether the format of the submitted grammar is syntactically valid, or can otherwise determine whether the grammar submitted by the developer is a viable grammar that can be used to create a new intent.

A valid grammar can be inducted by the developer voice action service or tool to convert the grammar into an intent and to expand the trigger phrase specified in the grammar. For example, induction of a grammar can involve translating a grammar submitted in a first format to an intent that is in a second format. In addition to translating the grammar into the intent, the trigger phrase submitted by the developer can be expanded to include other related trigger phrases. For example, one or more trigger phrase expansion rules, synonym rules, term optionalization rules, or other rules may be applied to the trigger phrase to generate one or more related trigger phrases that are associated with the intent. The generated intent can be stored at a contextual intent database along with one or more other intents that are each associated with an application, one or more trigger phrases, and optionally an activity, compound activity, context, or other information related to the intent or triggering of the intent.

After the grammar submitted by the developer has been established as an intent, a user may provide a voice input to a client device. The user's voice input can be transcribed to generate a transcription of the voice input, and the transcription can be matched against one or more trigger phrases associated with intents that are stored at the contextual intent database or one or more other databases that specify intents, such as a database that includes intents associated with an operating system of the client device. Based on determining that a portion of the transcription matches a trigger phrase associated with a particular intent, the intent can be triggered to cause an activity associated with the intent to be performed on or by the application specified by the particular intent.

For example, an intent associated with launching the taxi service application may be associated with the trigger phrase "Call a cab." Based on a client device receiving a user's voice input that includes the phrase "Call a cab," the client device or another system can trigger launching of the taxi service application.

Innovative aspects of the subject matter described in this specification may be embodied in methods that include the actions of receiving data identifying an application and a voice command trigger term, validating the received data, inducting the received data to generate an intent that specifies the application, the voice command trigger term, and one or more other voice command trigger terms that are determined based at least on the voice command trigger term, and storing the intent at a contextual intent database, wherein the contextual intent database comprises one or more other intents. Other embodiments of these aspects include corresponding systems, apparatus, and computer programs, configured to perform the actions of the methods, encoded on computer storage devices.

These and other embodiments may each optionally include one or more of the following features. In various examples, validating the received data comprises determining that the voice command trigger term is not associated with an application that is different from the identified application. The actions comprise receiving data identifying an action, wherein validating the received data comprises determining that the identified action is compatible with the identified application. Inducting the received data to generate the intent that specifies the application, the voice command trigger term, and the one or more other voice command trigger terms that are determined based at least on the voice command trigger term comprises translating the received data identifying the application, and the voice command trigger term to a different data format. Inducting the received data to generate the intent that specifies the application, the voice command trigger term, and the one or more other voice command trigger terms that are determined based at least on the voice command trigger term comprises generating one or more other voice command trigger terms that are determined based at least on the voice command trigger term by applying one or more synonym rules, optionalization rules, or expansion rules to the voice command trigger term.

The actions comprise obtaining audio data that includes a spoken utterance of a user, generating a transcription of the spoken utterance of the user based at least on the audio data, determining that at least a portion of the transcription matches a particular voice command trigger term specified by an intent that is stored in the contextual intent database, wherein the intent specifies a particular application, and the particular voice command trigger term, and based on determining that at least a portion of the transcription matches the particular voice command trigger term specified by the intent, causing a task to be performed. Causing the task to be performed comprises causing the particular application to perform the task. The actions may further comprise determining, for each of one or more intents that each specify (i) an application, and (ii) a voice command trigger term, that at least a portion of the transcription matches the voice command trigger term specified by the intent, requesting a selection of a particular application from among a set of applications that includes the applications specified by each of the one or more intents, receiving data indicating a selection of a particular application from among the set of applications that includes the applications specified by each of the one or more intents, and in response to receiving the data indicating the selection of the particular application, adjusting a strength of a relationship between the particular voice command trigger term and an intent that specifies the particular application.

The actions comprise determining, for each of one or more intents that each specify (i) an application, and (ii) a voice command trigger term, that at least a portion of the transcription matches the voice command trigger term specified by the intent, determining, for each of the one or more intents, an affinity measure for the intent that indicates an affinity of the voice command trigger term specified by the intent to the application specified by the intent, selecting, based at least on the affinity measure for each of the one or more intents, a particular intent, and causing a task specified by the particular intent to be performed. The actions comprise determining, for each of one or more intents that each specify (i) an application, and (ii) a voice command trigger term, that at least a portion of the transcription matches the voice command trigger term specified by the intent, ranking the one or more intents, selecting a particular intent based at least on the ranking of the one or more intents, and causing a task specified by the particular intent to be performed.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1:
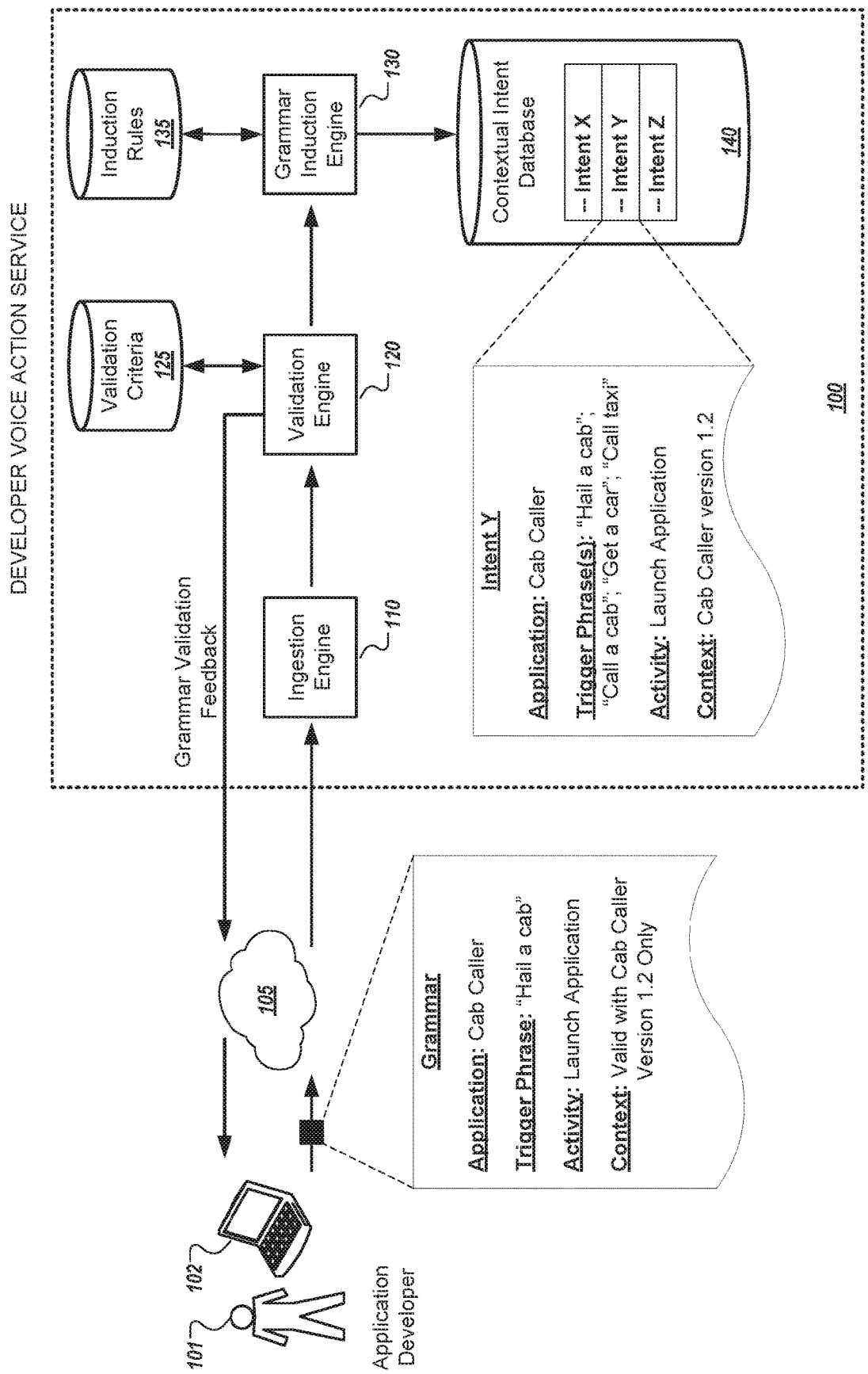
FIG. 1 depicts an example system for a developer voice actions system and service.

FIG. 1 illustrates an example of a developer voice action service system 100. Generally, the developer voice action service enables an application developer 101 to submit grammars that are treated as candidates for new intents by the developer voice action service system 100.

The developer voice action service system 100 validates the grammar submitted by the application developer 101 and, if valid, inducts the grammar by translating the grammar from the format in which it was submitted to an intent format, and expanding a trigger phrase specified by the grammar to include additional trigger phrases that are related to the specified trigger phrase. The developer voice action service system 100 stores this new intent at a contextual intent database 140 that includes other intents that specify various applications.

Briefly, the developer voice action service system 100 includes an ingestion engine 110, a validation engine 120, a grammar induction engine 130, and a contextual intent database 140. Any of the ingestion engine 110, validation engine 120, grammar induction engine 130, or contextual intent database 140 may be implemented as components of the developer voice action service system 100 that are independent of other systems that may be in communication with the developer voice action service system 100, such as another voice action service system, or may be implemented as components of those other systems. The validation engine 120 has access to validation criteria available at a validation criteria database 125, and the grammar induction engine 130 has access to induction rules available at an induction rule database 135. An application developer 101 can submit grammars to the developer voice action service system 100 using a computing device 102 that is in communication with the developer voice action service system 100 over one or more networks 105.

The application developer 101 can submit a grammar to the developer voice action service system 100 to request a new intent for a particular application. Specifically, the application developer 101 can submit a grammar using the computing device 102 that can communicate with the developer voice action service system 100 over the one or more networks 105.

A grammar submitted by the application developer 101 can specify various information relating to the generation of a new intent. Specifically, a grammar can specify a particular application, such as the particular application that the application developer 101 is developing for which they are attempting to generate the new intent. Alternatively, a grammar may specify a particular application that is different from the application that the application developer 101 is developing, such as a grammar that specifies a particular application that is related to or is in communication with the application that they are developing. In still other examples, a grammar may specify a particular aspect of an application, such as a particular sub-process, thread, or other division associated with an application that the application developer 101 is developing or another application. The application developer 101 can additional specify a trigger phrase in the grammar. A trigger phrase includes one or more terms that, when detected from a voice input provided by a user, trigger the intent. In some instances, a trigger phrase may include one or more arguments, where an argument acts as a placeholder in the trigger phrase that may be replaced by one or more terms of a user's voice input. For example, a trigger phrase stating "Take me to $location" may enable a user voice input such as "Take me to 1425 K Street Northwest, Washington D.C." to be identified as matching the trigger phrase. Other arguments may be detected, such as arguments specifying a place, a day, date, or time, a person, a contact stored at a user's client device, an item of content such as a song, movie, or other content item, or other arguments.

The grammar can also optionally specify a particular activity, defined as a task that is performed on or by the particular application specified by the grammar. Additionally, in some instances, the application developer 101 can specify a context associated with the grammar, where a context defines additional conditions that must be present for the triggering of the intent specified by the grammar, or where present modify selection of a triggered intent. In some implementations, a grammar submitted by an application developer 101 may specify a developer-defined type, where a type is defined as one or more terms that should be detected if included with the trigger phrase. For example, a developer-defined type that is identified by one or more terms may be associated with a particular type of application-specific mode, e.g., "sleep" or "lock," or may be identified by particular terms that are frequently used in conjunction with input provided to a particular application, e.g., a car model name for a used car search application, or may be a developer-defined type that is relevant to a certain application or trigger phrase. When a voice input is received from a user, a voice action service system may be more likely to detect the terms of a type rather than other terms. For example, the voice action service system may be more likely to detect the term "sleep" from a voice input than the term "slip," based on the "sleep" being a type defined by one or more grammars that have been submitted by application developers.

In some examples, a type may be associated with or operate to reference a particular entity. For example, a type that is defined by the terms "my house" may be associated with a property that is associated with a user, for example, based on the user having registered an address associated with the property with an application, a voice action service system, or based on the application developer 101 specifying in the grammar that the type defined by the terms "my house" should be associated with the user's property or an address of the property. Detecting the terms that define the type in a user voice input may cause an activity specified by a triggered intent to be performed with respect to the entity associated with the type.

For example, based on a user providing the voice input "Get me a cab to my house" to a voice action service system, the voice action service system may determine that the voice input matches a trigger phrase specified by an intent for a taxi service application, and may further determine that the terms "my house" included in the voice input correspond to a type that is associated with the user's home address. Thus, triggering of the intent may cause the taxi service application to request a taxi to take the user from their current location to their home address.

In such an example, the information specifying the user's home address may be stored in association with the instance of the taxi service application that is running on the user's client device, may be stored at the developer voice action service system 100, may be specified by the intent stored at the contextual intent database 140, or may otherwise be stored. In some examples, the entity associated with a type is specific to a particular user, such that the terms "my house" would reference different addresses of properties associated with different users, and the correct entity associated with the type may be selected for the user that providing a voice input including the type.

As an example, the application developer 101 can submit the grammar shown in FIG. 1. The grammar can specify an application called "Cab Caller" that is a taxi service application. Additionally, the grammar can specify the trigger phrase "Hail a cab" that the application developer 101 has indicated as a trigger phrase that should cause triggering of the intent generated from the grammar. The grammar also specifies a particular activity, namely launching of the specified application. Thus, triggering of the intent generated from the grammar will result in the "Cab Caller" application being launched. Again, triggering of an intent generated from a grammar is not limited to launching the third party's application, but may trigger other applications or functions as may be specified by the developer. The application developer 101 has additionally specified a context for the grammar. Specifically, the context indicates that the intent generated from the grammar should only be triggered if the client device providing the voice input that triggers the intent hosts "version 1.2" of the "Cab Caller" application. Many other contexts are contemplated by this disclosure, such as time of day, location, device orientation, weather, user authentication, proximity to an item or person carrying an item, presence (or absence) of particular software or components on a user's client device, etc.

The grammar submitted by the application developer 101 is received by the developer voice action service system 100 over the one or more networks 105 at the ingestion engine 110. The ingestion engine 110 provides an interface for computing devices, such as the computing device 102, to enable the developer voice action service system 100 to receive grammars submitted by application developers.

The ingestion engine 110 receives the grammar submitted by the application developer 101 and provides the grammar to the validation engine 120. The validation engine 120 receives the grammar and validates the grammar to determine whether a new intent can be generated based on the submitted grammar. To validate the grammar, the validation engine 120 may access validation criteria accessible at the validation criteria database 125. The validation criteria database 125 may include validation criteria that have been predetermined or that are generated in response to the received grammar.

For example, the validation engine 120 can validate a grammar by determining whether the trigger phrase specified by the grammar is already associated with an intent. Additionally or alternatively, validating the grammar may involve determining whether the application specified by the grammar is capable of performing a particular activity specified by the grammar or another default activity. For example, the validation engine 120 may have access to a manifest or other information that is associated with the application specified in the grammar that indicates information about the application, such as information indicating what activities can be performed on or by the application, what data is available to or within the application, or other information. The validation engine 120 may consult the manifest or other information associated with the identified application to validate the grammar.

Validating the grammar may further involve determining whether a context specified in the grammar is a proper context, for example, by ensuring that the context can be satisfied, e.g., that a "version 1.2" of the "Cab Caller" application exists. Validating the grammar may also involve determining that the grammar was provided in the proper format such that the grammar can be translated to the format of an intent. Additionally or alternatively, validating the grammar may involve determining that the trigger phrase submitted for the grammar is of a proper format, for example, by determining that arguments included in the trigger phrase are formatted correctly or are of a supported argument type. Validating the grammar may also include identifying one or more activities that are related to or required to perform an activity specified in a grammar received from the application developer 101. For example, if the application developer 101 specifies in a grammar an activity to request a taxi using a taxi service application, the validation engine 120 may determine that requesting a taxi using the taxi service application also involves the activities of launching the taxi service application on a user's client device and determining the user's location using a positioning system application running on the user's client device.

Additionally, the validation engine 120 can validate the received grammar by determining whether the formatting of the grammar or portions of the grammar are syntactically valid. In some instances, the grammar induction engine 130 may only be capable of inducting the received grammar if it is syntactically valid, that is, if its data structure is properly formatted according to the expected grammar format and includes only terms that can be processed or translated by the grammar induction engine 130.

In some implementations, feedback can be provided to the application developer 101 by the developer voice action service system 100. For example, the validation engine 120 can provide information to the computing device 102 of the application developer 101 that indicates whether the grammar submitted by the application developer 101 has been validated. Additional or different feedback may also be provided to the application developer 101, such as information indicating whether an intent has been successfully generated using the grammar, information specifying one or more other related trigger phrases that were generated based on the trigger phrase specified in the grammar, or other information.

Based on the validation engine 120 validating the grammar submitted by the application developer 101, the validation engine 120 can submit the grammar to the grammar induction engine 130. The grammar induction engine 130 can receive the grammar and can induct the grammar to generate an intent that is based on the grammar. Inducting the grammar can include translating the grammar from a format in which it is received by the developer voice action service system 100 to an intent format. Inducting the grammar can also include expanding the trigger phrase specified in the grammar by generating one or more other trigger phrases based on the trigger phrase specified in the grammar and that are related to the specified trigger phrase.

For example, the developer voice action service system 100 may enable application developers to submit grammars in a format that is more readily understood by an application developer or other user, for example, by enabling the application developers to submit grammars in a format that includes textual arguments. The grammar induction engine 130 can receive the grammar in this format, and can translate the grammar to a format for an intent, where the intent format may be a format that is more difficult for an application developer or other user to parse or comprehend, or may be a format that is specific to a voice action service.

Expanding a trigger phrase specified in a grammar submitted to the developer voice action service system 100 allows for the developer voice action service system 100 to generate one or more related trigger phrases that are based on the specified trigger phrase. Various expansion rules may be applied to the trigger phrase to generate the related trigger phrases. For example, one or more term optionalization rules, synonym rules, expansion rules, or other revision rules, such as other query term revision rules, may be applied to the trigger phrase specified in the grammar to generate one or more other trigger phrases that are related to the trigger phrase specified in the grammar and that are based at least partly on the trigger phrase specified in the grammar.

An optionalization rule may be applied to the trigger phrase that specifies whether a one or more particular terms in the trigger phrase are optional in related trigger phrases generated based on the trigger phrase specified in the grammar. A synonym rule may identify one or more synonyms for one or more terms of the grammar that may be included in a related trigger phrase generated based on the trigger phrase specified in the grammar. An expansion rule may enable the trigger phrase specified in the grammar to be expanded to include one or more additional terms, such as one or more terms that are identified as similar or related to a term or terms in the trigger phrase specified in the grammar. Other rules for generating related trigger phrases based on the trigger phrase specified in the grammar may be applied.

Additionally, in some examples the grammar induction engine 130 may generate one or more trigger phrases that are related to the trigger phrase specified in the received grammar by translating the received trigger phrase or one or more related trigger phrases generated for the specified trigger phrase to one or more other languages. For example, the trigger phrase "Hail a cab" can be translated from English to one or more of Mandarin Chinese, Spanish, Arabic, French, Hindi, German, Russian, or other languages, and the one or more translations may be identified as trigger phrases related to the trigger phrase "Hail a cab" specified in the grammar.

Additionally, in some instances the grammar induction engine 130 may be capable of determining variants and permutations of terms or arguments included in the trigger phrase specified in the received grammar. For example, if a trigger phrase specified in a grammar that is associated with a shopping application specifies an argument for a clothing size parameter in a first unit, e.g., a suit size in US sizing, the grammar induction engine 130 may be capable of determining variants or permutations of this argument, such as by including in another trigger phrase an argument for the clothing size parameter in a second unit, e.g., a suit size in European sizing.

In some instances, the grammar induction engine 130 can determine and associate a strength of relationship score with one or more of the trigger phrase specified in the grammar and the trigger phrases that are determined based on the trigger phrase specified in the grammar. The strength of relationship score can indicate an estimate of the applicability or uniqueness of the trigger phrase to the application specified in the grammar. For example, based on received a grammar that specifies the trigger phrase "Hail a cab" from the application developer 101, the grammar induction engine 130 can determine a strength of relationship between the trigger phrase "Hail a cab" and the trigger phrase "Call a taxi" that is identified as a related trigger phrase based at least on the trigger phrase specified in the received grammar.

In some instances, the validation engine 120 and/or the grammar induction engine 130 can determine the strength of a relationship between a trigger phrase and an application to determine whether the requested grammar is spam. For example, the grammar induction engine 130 can determine a strength of relationship between the trigger phrase "Hail a cab" and the "Cab Caller" taxi service application or intents that specify the cab caller application, and can assign a strength of relationship score to the trigger phrase "Hail a cab" based on the determination. Additionally, in some examples, advertisers or application developers may be tempted to submit grammars to the developer voice action service that specify an application that they are trying to promote and a trigger phrase. The validation engine 120 and/or the grammar induction engine 130 may determine that the trigger phrase does not have a sufficiently strong relationship to the identified application, and may therefore refuse to generate a new intent based on the received grammar, and/or may provide feedback to the user who submitted the grammar indicating that they must provide a trigger phrase that is more strongly related to the application.

For example, an advertiser for a sports news application may submit a grammar specifying the sports news application and the trigger phrase "Call a taxi." The validation engine 120 and/or the grammar induction engine 130 may determine that the trigger phrase "Call a taxi" does not have a sufficiently strong relationship to the sports news application and may deny a new intent from being generated based on the grammar.

In some implementations the grammar induction engine 130 may also provide feedback to the application developer 101 at the computing device 102. For example, based on inducting the received grammar to generate one or more other trigger phrases that are determined based at least on the trigger phrase identified by the grammar submitted by the application developer 101, feedback can be presented to the application developer 101 that identifies the one or more other trigger phrases, to allow the application developer 101 to evaluate the one or more other trigger phrases to determine whether the other trigger phrases are acceptable alternate trigger phrases for the identified trigger phrase. In some implementations, the application developer 101 may be able to provide a response to the feedback, for example, to indicate which of the one or more other trigger phrases that were generated by the grammar induction engine 130 should be specified in the new intent.

Additionally, in some instances, the grammar induction engine 130 or another component of the developer voice action service system 100 may generate one or more example queries or voice inputs based on the received intent, the one or more other trigger phrases that are determined based on the trigger phrase specified by the received grammar, or the intent generated from the received intent. The example queries or voice inputs can be used as examples to teach users how to use a voice action service that has access to the intents stored at the contextual intent database 140. For example, the example queries or trigger phrases can be provided for output to a user when a user first provides a voice input that triggers the intent generated from the grammar submitted by the application developer 101.

Based on the grammar induction engine 130 having expanded the trigger phrase specified in the grammar by generating one or more related trigger phrases and having translated the grammar including the one or more related trigger phrases to the intent format, the developer voice action service system 100 can store the new intent at the contextual intent database 140. For example, the new intent generated based on the grammar submitted by the application developer 101 can be added as "Intent Y" to a set of intents stored at the contextual intent database 140 that also includes at least "Intent X" and "Intent Z." "Intent Y" and "Intent Z," for example, can be intents generated based on grammars submitted by one or more other application developers that may be associated with one or more applications that may be different from or the same as the application specified in the grammar submitted by the application developer 101.

The intent stored at the contextual intent database can specify parameters specified by the grammar submitted by the application developer 101 in the intent format. For example, "Intent Y" generated based on the grammar submitted by the application developer 101 may specify the "Cab Caller" application, may specify a launch application activity that is to be performed on or by the "Cab Caller" application if the intent is triggered, and may specify the context that imposes an additional condition on triggering of the intent, namely that the client device on which the intent may be triggered must feature "version 1.2" of the "Cab Caller" application. Additionally, "Intent Y" may specify the trigger phrase submitted by the application developer 101 as well as one or more additional trigger phrases that the developer voice action service system 100 determined based at least on the trigger phrase submitted by the application developer 101. For example, the trigger phrase "Hail a cab" may be expanded to also include the trigger phrases "Call a cab," "Get a car," and "Call taxi," the detection of any of which would result in the triggering of "Intent Y" so long as the additional context is satisfied.

Once an intent has been generated based on the grammar submitted by the application developer 101 and stored at the contextual intent database 140, users may be capable of triggering the intent by providing a voice input that includes a trigger phrase that is associated with the intent. For example, based on a user of a client device that hosts "version 1.2" of the "Cab Caller" application providing the voice input "Call taxi" to the client device, the client device may determine that the voice input includes the trigger phrase "Call taxi," may determine that the mobile device hosts "version 1.2" of the "Cab Caller" application, and may in response trigger the "Intent Y" that causes the "Cab Caller" application to launch on the user's client device.

In some implementations, the process of storing the newly generated intent at the contextual intent database 140 can be a process that is also supported with rapid update pushing or deployment support. For example, the voice developer voice action service system 100 may be capable, once it has inducted the received grammar, of rapidly storing the newly created intent at the contextual intent database 140 and making the newly generated intent available to users of a voice action service that has access to the intent stored in the contextual intent database 140.

Figure 2:
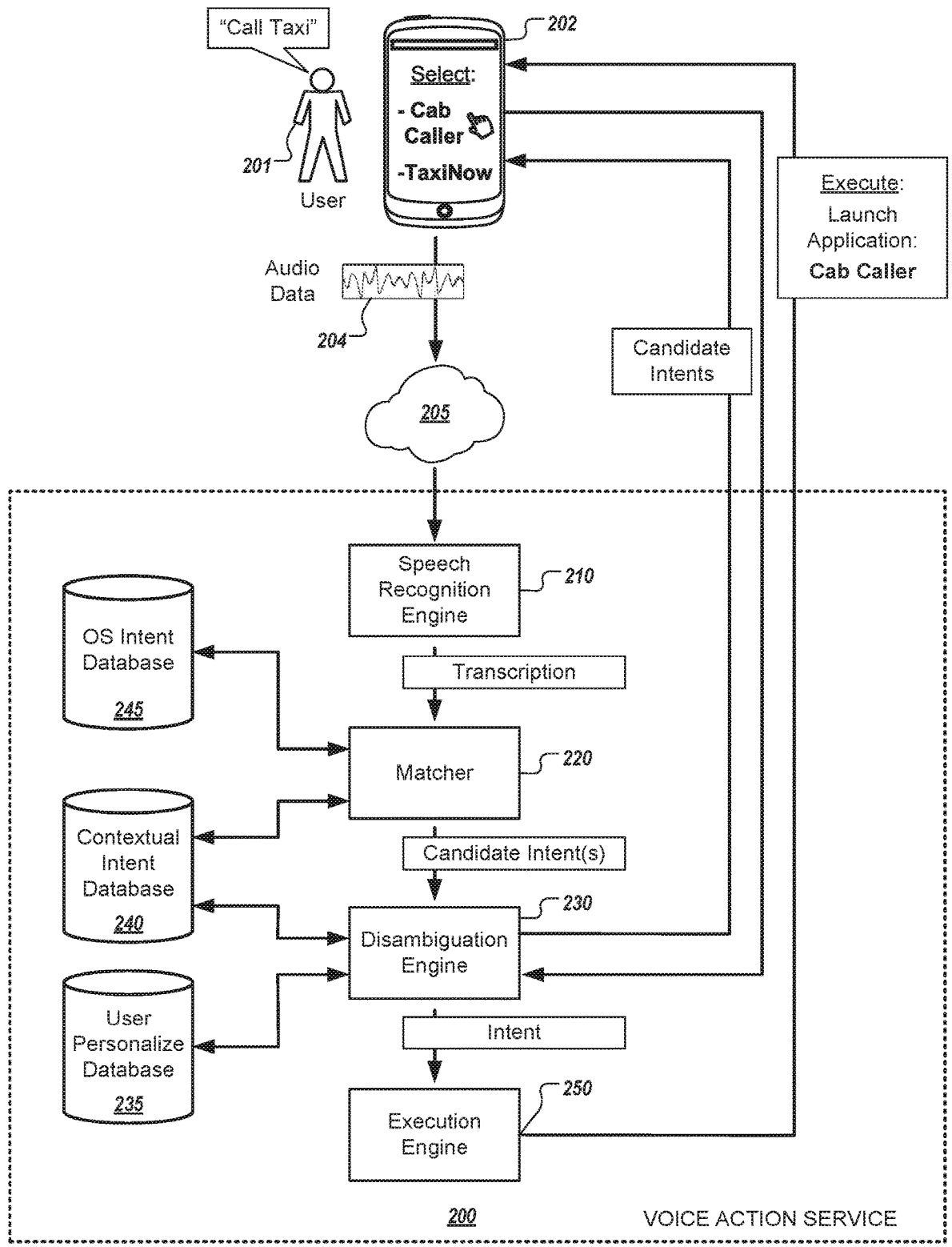
FIG. 2 depicts an example system for using a voice actions system and service.

FIG. 2 illustrates an example use case of a voice action service system 200 that enables a user to submit a voice input that is matched to an intent stored by a contextual intent database 240. Matching the voice input to the intent causes an activity specified by the intent to be performed on or by an application at the user's client device 202, where the application is also specified by the intent.

Briefly, as shown in FIG. 2, the voice action service system 200 includes a speech recognition engine 210, a matcher 220, a disambiguation engine 230, and an execution engine 250. The speech recognition engine 210 receives audio data over one or more wired or wireless networks 205 that includes a voice input from a user 201 of a client device 202. For example, the user 201 may provide a voice input to a voice interface application hosted on the client device 202, and the voice interface application hosted on the client device 202 may transmit audio data that includes the voice input to the voice action service system 200 over the one or more networks 205. While shown as separate from client device 202 in FIG. 2, in certain embodiments one or more of speech recognition engine 210, matcher 220, disambiguation engine 230, and execution engine 250, as well as other systems and subsystems discussed herein, may alternatively be implemented or form a part of the client device 202 associated with the user 201.

In some instances, the speech recognition engine 210 may have access to one or more types that are defined by the voice action service system 200. For example, the voice action service system 200 may have access to one or more knowledge bases that identify entities such as people, places, items of content such as movies or songs, or other defined types. The speech recognition engine 210 or other components of the voice action service system 200 may access the one or more knowledge bases when performing speech recognition on the audio data 240 or when performing other operations relating the selection and execution of an intent based on a user's voice input.

The matcher 220 has access to a contextual intent database 240 that includes one or more intents that have been generated based on grammars submitted by application developers such as the application developer 101 of FIG. 1. The matcher 220 additionally has access to an operating system (OS) intent database 245 that includes one or more intents that are specific to one or more specific operating systems or that are specified by an operating system as pertaining to a particular application. For example, intents stored at the OS intent database 245 may include intents for activities performed by the operating system, such as activities to restart or lock a device, join a wireless network, etc., or activities performed by the operating system that pertain to one or more applications, such as activities to launch a messaging, telephone, or email application. Additionally, the disambiguation engine 230 has access to a user personalization database 235 that includes information specific to particular users or client devices. The user personalization data may be used to disambiguate intents that are determined to match the voice input received from the client device 202.

As shown in FIG. 2, the user 201 can have a client device 202 that is capable of receiving voice inputs, such as voice commands provided by the user 201 to perform one or more actions. In some instances, the client device 202 includes a microphone or other device for obtaining voice inputs from a user, and an operating system or application running on the client device 202 can include software for receiving voice inputs. The client device 202 can receive a voice input from the user 201, such as the voice input "Call taxi." Based on the client device 202 receiving the voice input, the client device can transmit audio data 204 that includes the voice input over the one or more networks 205 to the voice action service system 200.

The speech recognition engine 210 of the voice action service system 200 receives the audio data 204 and performs speech recognition processing on the audio data 204 to obtain a transcription of the voice input included in the audio data 204. For example, the speech recognition engine 210 can receive the audio data 204 and can optionally filter the audio data 204 to remove noise or background audio from the audio data 204 and generate a clean version of the audio data 204. The speech recognition engine 210 can then perform speech recognition processing on the clean version of the audio data 204 to obtain a transcription of the voice input. For example, the speech recognition engine 210 may generate the transcription "Call taxi" from the audio data 204 received from the client device 202.

The speech recognition engine 210 provides the transcription of the audio data 204 to the matcher 220. The matcher 220 matches the transcription against one or more trigger phrases that are specified by intents stored at the contextual intent database 240 or the OS intent database 245. In some instances, determining that the transcription matches a particular trigger phrase associated with a particular intent can involve determining that at least a portion of the transcription matches the particular trigger phrase, such as determining that one or more terms of the transcription match one or more terms of the particular trigger phrase. Therefore, a particular transcription may be determined as potentially calling upon multiple intents, such that the voice action service system 200 must determine a particular intent to trigger from among the candidate intents. Based on determining that the transcription matches one or more trigger phrases specified by one or more candidate intents, the matcher 220 can provide information to the disambiguation engine 230 that specifies the one or more candidate trigger phrases.

In some instances, the user 201 may provide a textual input to the client device 201, such that the textual input may be provided directly to the matcher 220 without being provided to the speech recognition engine 210. The matcher 220 may receive the textual input and may performing the matching operations discussed above to identify one or more candidate intents based on the textual input. In some instances, the matcher 220 may be capable of identifying types or other features, such as arguments, that are included in the textual input. at are included in the textual input.

In some examples, the matcher 220 may expand the transcription of the audio data 204 to generate one or more related transcriptions of the audio data 204. For example, the transcription "Call taxi" may be expanded using one or more query term expansion rules, synonym rules, term optionalization rules, or other rules to generate the related transcriptions "Call a taxi," "Request a cab" "Hail a car," etc. The matcher 220 may match one or more of the related transcriptions to trigger phrases specified by intents stored at the contextual intent database 240 or the OS intent database 245 to determine a trigger phrase that the transcription or a related transcription matches.

In some examples, expanding the transcription of the audio data 204 requires the matcher 220 to determine whether a related transcription would conflict with a trigger phrase that already exists or that is associated with a different application. For example, the trigger phrase "Call taxi" may be specified by an intent associated with the taxi service application "Cab Caller" and the related trigger phrase "Request a cab" may be specified by an intent associated with the taxi service application "TaxiNow." The matcher 220 may determine that the transcription and the related transcription match trigger phrases that are specified by intents related to different application, and therefore in some examples may ignore or remove the related transcription "Request a cab" from the matching process. Thus, the matcher 220 or another component of the voice action service system 200 may be able to adjust a transcription of a user input to increase the chances of a match being detected, while also handling any conflicts generated by the expanded the transcription of the audio data 204.

The disambiguation engine 230 can receive the information specifying the one or more candidate intents, and can perform operations to identify a particular intent to trigger call from among the candidate intents. The disambiguation engine 230 may identify the particular intent to trigger from among the candidate intents based on information accessed at the user personalization database 235, based on a confidence score associated with each of the candidate intents, based on requesting and receiving user feedback that selects a particular candidate intent to trigger, or based on other information.

For example, the voice action service system 200 may receive or be capable of receiving information that identifies the user 201 or the client device 202 being used by the user 201, for example, based on the user 201 being logged into a particular application that is hosted by the client device 202, based on the client device 202 submitting information identifying the user 201 or the client device 202 to the voice action service system 200. The disambiguation engine 230 may identify the user 201 or the client device 202 based on this identifying information and may access information at the user personalization database 235 that specifies information relating to intents for the particular user 201 or client device 202. For example, the information accessed by the disambiguation engine 230 at the user personalization database 235 may specify that the user 201 typically provides the voice input included in the audio data 204 or particular textual input to trigger a particular intent, such as opening a particular application. Similarly, the information accessed at the user personalization database 235 may specify preferences that have provided by the user 201 or determined based on past activity by the user 201. For example, the voice action service system 200 may determine based on past user activity that the user 201 likely prefers a particular taxi service application over another, or may determine that the user 201 typically uses a particular term when referring to a particular application.

Based on the information accessed at the user personalization database 235, the disambiguation engine 230 can select a particular intent from among the candidate intents and provide information to the execution engine 250 that identifies the particular intent. For example, the disambiguation engine 230 may receive information identifying two candidate intents that have been identified based on the transcription "Call taxi." One candidate intent may specify the "Cab Called" taxi service application and the second intent may specify a taxi service application called "TaxiNow." The disambiguation engine 230 may access information at the user personalization database 235 and determine that the user 201 or a user of the client device 202 typically uses the "Cab Caller" taxi service application over the "TaxiNow" taxi service application, and so may select the candidate intent that specifies the "Cab Caller" application from among the two candidate intents. The disambiguation engine 230 can then transmit information to the execution engine 250 that identifies the intent that specifies the "Cab Caller" application. In this way, the disambiguation engine 230 can rely on personalization data for the user 201 to select a particular candidate intent without requiring additional input from the user 201.

Alternatively, the disambiguation engine 230 can identify a particular intent from among the set of candidate intents based on confidence scores associated with each of the candidate intents. For example, each of the candidate intents may be associated with a confidence score that approximates the confidence that the candidate intent is the intent that the user 201 meant to trigger using the voice action. In some instances, the disambiguation engine 230 or the matcher 220 can determine the confidence scores for each of the candidate intents.

A confidence score assigned to a candidate intent can be based on one or more factors. For example, the confidence score may be determined based at least in part on the exactness of the match between the transcription and a trigger phrase specified by the intent. In such an example, a candidate intent that specifies a trigger phrase that exactly matches the transcription may be assigned a confidence score that indicates a high confidence that the candidate intent was the intention of the user 201.

In other implementations, different trigger phrases specified by an intent may be associated with scores that indicates a strength of relationship between the trigger phrase and the intent, and the confidence score may be determined based at least in part on the strength of relationship score for the matched trigger phrase. For example, a strength of relationship score for the trigger phrase "Hail a cab" may indicate a stronger relationship between the trigger phrase and an intent that specifies the "Cab Caller" application than a strength of relationship score for the trigger phrase "Get a car" that is specified by the same intent.

Other factors may be considered in determining a confidence score for a candidate intent, such as how frequently the candidate intent has been triggered, how recently the candidate intent has been triggered, what other applications may be running on the client device 202 at the time the voice action is received that may be related or frequently used at the same time as the application specified by the candidate intent, based on a user's location or an activity that the user is identified as being involved in, or based on other information. In some implementations, a combination of these factors may be considered in determining the confidence score for a particular candidate intent. Based on the confidence scores of the one or more candidate intents, a particular candidate intent can be selected by the disambiguation engine 230, and the disambiguation engine can transmit information to the execution engine 250 that identifies the selected candidate intent.

Additionally, the actions of other users may be considered when determining a confidence score for a candidate intent, such as how many other users are actively using the application specified by the candidate intent, how many of a user's contacts or friends are using the application specified by the candidate intent, etc. For example, based on a user providing the voice input "Call taxi," the voice action service system 200 may determine that two candidate taxi service applications may be triggered by the voice input, and may further determine that more taxi drivers are currently using one of the applications over the other. As a result, a confidence score assigned to an intent for the taxi service application that has more drivers actively using the application may be higher than a confidence score assigned to an intent for the taxi service application that has fewer drivers actively using the application.

In still other examples, the disambiguation engine 230 may provide a request to the client device 202 for the user 201 to select a particular candidate intent from among one or more of the candidate intents. For example, based on receiving the information specifying one or more candidate intents from the matcher 220, the disambiguation engine can cause a request to be provided at the client device 202 for the user 201 to select a particular candidate intent, or a particular application that is specified by a particular candidate intent.

The disambiguation engine 230 can receive information indicating the selection by the user 201, and can provide information to the execution engine 250 that identifies the particular candidate intent that the user 201 selected.

For example, based on determining that the transcription "Call taxi" matches a trigger phrase associated with an intent that specifies the "Cab Caller" application and also matches a trigger phrase associated with an intent that specifies the "TaxiNow" application, the disambiguation engine 230 can provide a user interface to the user 201 at the client device 202 that requests the user 201 select either the "Cab Caller" application or the "TaxiNow" application. The disambiguation engine 230 can receive information indicating that the user selected the "Cab Caller" application, and in response can provide information to the execution engine 250 that identifies the candidate intent that specifies the "Cab Caller" application.

In some implementations, the disambiguation engine 230 can rank the candidate intents based on confidence scores or other information, and can select a particular candidate intent or display the candidate intents in a user interface presented to the user 201 based on the ranking. For example, the disambiguation engine 230 may rank the candidate intents based on confidence scores determined for each of the candidate intents, e.g., such that candidate intents with higher confidence scores are ranked above candidate intents with lower confidence scores. Other factors may affect the ranking of a candidate intent, such as how frequently or how recently a candidate intent was triggered, how frequently or recently an application specified by a candidate intent was selected by a user in response to a similar voice input.

In some instances, a user interface that requests a user selection of a particular candidate intent from among multiple candidate intents or that requests selection of a particular application specified by a candidate intent from among a set of applications that are each specified by at least one candidate intent can present the candidate intents or applications to the user differently based on a ranking, confidence score, or other information or factors associated with the candidate intents or rankings. For example, based on determining that the "Cab Caller" application specified by a candidate intent is more frequently selected by the user 201 than the "TaxiNow" application, a user interface presented to the user 201 requesting selection of one of the "Cab Caller" or "TaxiNow" applications can show the option for the "Cab Caller" as a larger selectable icon than the option for the "TaxiNow" application, can display the option for the "Cab Caller" application above the option for the "TaxiNow" application, as shown in FIG. 2, or can otherwise show the options differently or in different locations of the user interface.

In some instances, the disambiguation engine 230 can also update information at the user personalization database 235 based on the disambiguation determining or receiving information selecting a particular candidate intent from among the one or more candidate intents. For example, based on the disambiguation engine 230 receiving a selection by the user 201 of the "Cab Caller" application in response to providing the voice input "Call taxi," the disambiguation engine 230 may update user personalization information at the user personalization database and/or the contextual intent database 240. Updating such personalization information may involve increasing a strength of relationship score between the trigger phrase "Call taxi" and the candidate intent that specifies the "Cab Caller" application, may involve adjusting a confidence score for the candidate intent that specifies the "Cab Caller" application to indicate a stronger confidence, adjusting a confidence score for the candidate intent that specifies the "TaxiNow" application to indicate a reduced confidence, or may otherwise update personalization information or information associated with intents stored at the user personalization database 235 or the contextual intent database 240.

In other examples, the disambiguation engine may also be able to access the intents stored at the contextual intent database 140 or the OS intent database, and may be able to modify or adjust parameters associated with an intent or information related to an intent. For example, based on determining that the user 201 has selected the "Cab Caller" application and not the "TaxiNow" application at a user interface provided to the user 201 in response to the user's voice input "Call taxi," the disambiguation engine 230 can update the candidate intent that specifies the "TaxiNow" application and that is stored at the contextual intent database 140 to remove the trigger phrase "Call taxi" from a set of trigger phrases specified for the intent, or adjusting a strength of relationship score for the trigger phrase "Call taxi" specified by the intent. This and similar processes can enable the voice action service system 200 to evaluate the recall capabilities of the service in triggering the proper intents, and to adjust the intents or information associated with the intents to increase the accuracy or efficiency of the voice action service.

In some examples, feedback from multiple users may be aggregated and analyzed in determining how to adjust parameters associated with an intent or information related to the intent. For example, based on feedback aggregated from a body of users indicating that the trigger phrase "Call taxi" typically results in users selecting the "Cab Caller" application over the "TaxiNow" application, the voice action service system 200 can determine to increase a strength of relationship or confidence score for the trigger phrase "Call taxi" and the intent that specifies the "Cab Caller" application or the "Cab Caller" application itself.

While discussed separately above, one or more of the methods available to the disambiguation engine 230 may be used to select a particular intent from among the candidate intents. For example, the disambiguation engine 230 may receive data identifying a set of five candidate intents from the matcher 220 and may eliminate three of the candidate intents based on confidence scores associated with or determined for the five candidate intents. The disambiguation engine 230 may then output a request to the client device 202 that requests the user 201 select from among the applications specified by the remaining two candidate intents to determine a particular candidate intent. The disambiguation engine 230 can then transmit information identifying the candidate intent specifying the user-selected intent to the execution engine 250.

Additionally, in some instances the voice action service system 200 may present different user interfaces to a user based on an analysis of the candidate intents by one or more of the methods used by the disambiguation engine 230. For example, if the disambiguation engine 230 selects a particular candidate intent based only upon confidence scores for the candidate intents, the disambiguation engine 230 may provide a user interface to the user 201 at the client device 202 that identifies the particular intent or the application specified by the particular intent. Alternatively, if the disambiguation engine 230 determines based on the confidence scores of the candidate intents that the disambiguation engine 230 should request a user selection of a candidate intent or application specified by a candidate intent, the disambiguation engine 230 can provide a different user interface for output at the client device 202 that requests a user selection.

The execution engine 250 can receive information identifying a particular intent from the disambiguation engine 230 and can trigger the intent to cause an activity specified by the intent to be performed on or by an application specified by the intent. For example, the execution engine 250 may access the identified intent at the contextual intent database 240 or may otherwise access or receive the identified intent. The execution engine 250 may trigger the intent to cause an activity specified by the intent to be performed on or by an application specified by the intent. For example, the execution engine 250 may cause the activity to be performed on the specified application, may provide control to an operating system or other application to perform the activity on the application, or may cause the application to perform the specified activity. In other examples, the execution engine 250 may provide information to the client device 202 that identifies the intent to trigger or an activity specified by the intent to trigger, and the client device 202 may receive the information and trigger the intent or the activity based on the received information. In some instances, the execution engine 250 may be implemented at the client device 202.

As an example, based on receiving information from the disambiguation engine 230 that identifies the candidate intent that specifies the "Cab Caller" application, the execution engine 250 can access the intent that specifies the "Cab Caller" application at the contextual intent database 240 and can trigger the intent that specifies the "Cab Caller" application. Triggering the intent that specifies the "Cab Caller" application may involve determining an activity specified by the intent, such as an activity that launches the "Cab Caller" application. Based on determining that the activity specified by the intent is an activity to launch the "Cab Caller" application, the execution engine 250 may transmit information that causes the client device 202, or an application, operating system, or other software hosted on the client device 202 to launch the "Cab Caller" application on the client device 202.

In some instances, triggering the intent may involve transmitting the intent or information associated with the intent without determining the activity specified by the intent. For example, the execution engine 250 may transmit data associated with the identified intent to the client device 202 without determining an activity specified by the intent. In such a case, the client device 202, or an application, operating system, or other software hosted by the client device may determine the activity to perform based on the intent, and may cause the activity to be performed on or by the application specified in the intent.

The client device 202 may receive information from the execution engine 250 and based on the information may perform operations to carry out the activity specified by the identified intent. For example, the client device 202 may receive the intent identified by the disambiguation engine 230 or may receive information instructing the client device 202 or software hosted by the client device 202 to carry out the activity specified by the identified intent, such as an activity to launch the "Cab Caller" application. Based on the received information the client device 202 or software hosted by the client device 202 can perform the activity. For example, an operating system of the client device 202, the "Cab Caller" application itself, or another application hosted on the client device 202 can launch the "Cab Caller" application in response to the received information. In this way, the "Call taxi" voice input provided by the user 201 can cause the launching of the "Cab Caller" taxi service application, such that the user 201 would then be able to request a taxi using the "Cab Caller" application.

Figure 3:
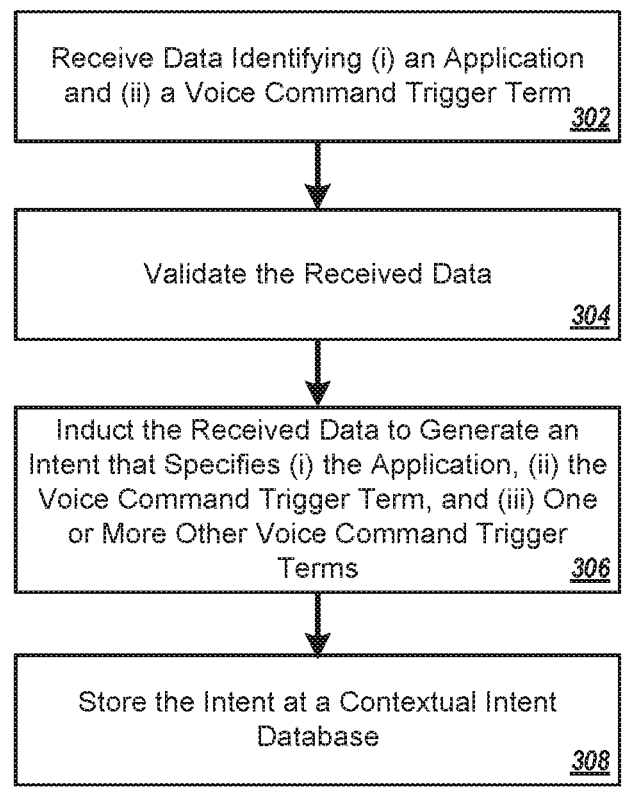
FIG. 3 is a flowchart of an example process associated with a developer voice actions system and service.

FIG. 3 depicts a flowchart of an example process 300 for a developer voice action service. In some implementations, the process 300 of FIG. 3 may be performed by the developer voice action service system 100 of FIG. 1, or may be performed by another system that is located local to or remote from a client device, such as a system that is accessible and configured to receive information from the client device over one or more networks.

The process 300 begins by receiving data that identifies at least an application and a trigger phrase (302). For example, the ingestion engine 110 of FIG. 1 can receive a grammar from the computing device 102 associated with the application developer 101 over one or more networks 105, and the received grammar can specify at least an application and a trigger phrase. The received data can be treated as a candidate for a new intent that is to be registered with the developer voice action service system 100. In some examples, as described, other information may be specified in the grammar received from the application developer 101, such as information specifying an activity or compound activity that is to be performed on or by the specified application, a context that is to be associated with the new intent, one or more arguments associated with the trigger phrase, or other information.

The information identifying the application and the trigger phrase can be validated to determine whether the information can be used to generate a new intent (304). For example, the validation engine 120 of the developer voice action service system 100 can validate the information received by determining that a trigger phrase identified by the data is an acceptable trigger phrase, e.g., that the trigger phrase is not already associated with another intent or that the trigger phrase is not sufficiently related to the identified application. Validating the received information may further involve determining whether the format of the received information can be translated to generate a new intent, can involve determining whether the application or an activity identified in the received data is a valid application or is an activity that can be performed by the identified application, or can involve other validation procedures.

In some instances, feedback can be provided to the computing device 102 associated with the application developer 101 that includes information relating to or determined based on the validation procedures performed on the received information. For example, feedback may indicate whether the grammar submitted by the application developer 101 has passed the validation process such that the grammar can be translated to generate a new intent, or can indicate reasons why the grammar submitted by the application developer 101 failed to pass the validation process.

The received information can be inducted to generate an intent that specifies at least the application, the trigger phrase identified by the received data, and one or more other trigger phrases that are determined based at least on the trigger phrase identified by the received data (306). Inducting the received information involves determining one or more additional trigger phrases that are determined based at least on the identified trigger phrase, by expanding the identified trigger phrase to generate one or more related trigger phrases. For example, as described, the trigger phrase identified in the received data can be expanded by using one or more expansion rules, synonym rules, term optionalization rules, or other rules, and can be expanded to include translations of the identified trigger phrase and related trigger phrases to other languages.

Inducting the received information can also involve translating the received information from the grammar format in which it is received from the computing device 102 to format for an intent, to generate a new intent that specifies at least the application, the identified trigger phrase, and one or more additional trigger phrases that are determined based at least on the identified trigger phrase. In some instances, translating the received information can also include translating the one or more trigger phrases that are determined based at least on the identified trigger phrase from a first format, such as grammar format of the received information, to the intent format to generate the new intent.

The new intent that specifies at least the application, the trigger phrase identified in the received information, and the one or more additional trigger phrases is stored at a contextual intent database (308). For example, based on the induction engine 130 of FIG. 1 inducting the grammar received from the application developer 101 to generate a new intent, the developer voice action service system 100 can store the new intent at the contextual intent database 140. The stored intent can specify at least the identified application, the identified trigger phrase, and the one or more trigger phrases determined based at least on the identified trigger phrase. The new intent stored at the contextual intent database 140 can specify other information as well, such as an activity to be performed on or by the application when the intent is triggered, one or more contexts associated with the intent, one or more strength of relationship scores that estimate a strength of a relationship between a trigger phrase and the application or the activity, or other information. The new intent can be stored at the contextual intent database 140 along with one or more other intents, to enable a future voice input provided by a user to be matched to a trigger phrase specified by one of the stored intents. In response to detecting the match, the matched intent can be triggered to cause the activity specified by the matched intent to be performed on or by an application specified by the matched intent.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method, comprising:
receiving, by a voice action service system, a spoken utterance provided at a computing device of a user, the spoken utterance including a voice command trigger phrase;
processing, by the voice action service system, the spoken utterance to determine an intent associated with the voice command trigger phrase, wherein the intent specifies an activity to be performed via the computing device of the user;
identifying, by the voice action service system, at least a first application and a second application that are each capable of satisfying the intent, wherein identifying at least the first application and the second application is based on determining at least the first application and the second application are associated with the intent in one or more databases;
selecting, by the voice action service system, the first application over the second application,
wherein selecting the first application over the second application is based at least in part on recency of usage of the first application by the user for the activity specified by the intent, the usage being a past usage of the first application by the user for the activity specified by the intent, the past usage being prior to receiving the spoken utterance including the voice command trigger phrase, and
wherein selecting the first application over the second application based at least in part on the recency of usage of the first application by the user comprises determining that the first application was most recently selected, by the user, in response to receiving a prior spoken utterance including the voice command trigger phrase, the prior spoken utterance being received prior to receiving the spoken utterance including the voice command trigger phrase;
providing, to the computing device of the user by the voice action service system and responsive to the spoken utterance, an indication of the selected first application;
receiving, by the voice action service system, an additional spoken utterance at the computing device of the user, the additional spoken utterance including a confirmation of the selected first application; and
in response to receiving the additional spoken utterance, executing the first application to satisfy the intent, wherein executing the first application to satisfy the intent comprises causing the selected first application to perform the activity specified by the intent.

2. The computer-implemented method of claim 1, wherein selecting the first application over the second application is further based at least in part on a strength of relationship score between the first application and at least one of: the voice command trigger phrase and the intent.

3. The computer-implemented method of claim 1, wherein selecting the first application over the second application is further based at least in part on the first application being executed on the computing device of the user when the spoken utterance is received.

4. The computer-implemented method of claim 1, wherein providing the indication of the selected first application comprises providing an audible indication of the selected first application.

5. The computer-implemented method of claim 1, wherein processing the spoken utterance to determine the intent comprises:
performing, by the voice action service system, speech recognition on the spoken utterance to obtain a transcription of the spoken utterance; and
determining, by the voice action service system, at least a portion of the transcription includes the voice command trigger phrase and that the voice command trigger phrase matches the intent.

6. The method of claim 1, wherein the activity specified by the intent is a ride booking activity.

7. A system, comprising:
at least one processor; and
at least one memory comprising instructions that when executed, cause the at least one processor to:
receive a spoken utterance provided at a computing device of a user, the spoken utterance including a voice command trigger phrase;
process the spoken utterance to determine the spoken utterance includes the voice command trigger phrase;
identify at least a first application and a second application, wherein identifying at least the first application and the second application is based on determining at least the first application and the second application are mapped to the voice command trigger phrase in one or more databases;
select the first application over the second application, wherein selecting the first application over the second application is based at least in part on recency of usage of the first application by the user, the usage being a past usage prior to receiving the spoken utterance including the voice command trigger phrase, the past usage being prior to receiving the spoken utterance including the voice command trigger phrase, and
wherein the instructions to select the first application over the second application based at least in part on the recency of usage of the first application by the user comprise instructions to determine that the first application was most recently selected, by the user, in response to receiving a prior spoken utterance including the voice command trigger phrase, the prior spoken utterance being received prior to receiving the spoken utterance including the voice command trigger phrase;
provide, to the computing device of the user and responsive to the spoken utterance, an indication of the selected first application; and
receive an additional spoken utterance at the computing device of the user, the additional spoken utterance including a confirmation of the selected first application; and
in response to receiving the additional spoken utterance, execute the selected first application to satisfy the intent, wherein the instructions to execute the selected first application to satisfy the intent comprise instructions to cause the selected first application to perform the activity specified by the intent.

8. The system of claim 7, wherein the instructions to select the first application over the second application further comprise instructions to select the first application over the second application based at least in part on a strength of relationship score between the first application and the voice command trigger phrase.

9. The system of claim 7, wherein the instructions to select the first application over the second application further comprise instructions to select the first application over the second application based at least in part on the first application being executed on the computing device of the user when the spoken utterance is received.

10. The system of claim 7, wherein the instructions to provide the indication of the selected first application further comprise instructions to provide an audible indication of the selected first application.

11. A non-transitory computer-readable storage medium comprising instructions that, when executed, cause at least one processor to:
receive a spoken utterance provided at a computing device of a user, the spoken utterance including a voice command trigger phrase;
process the spoken utterance to determine an intent associated with the voice command trigger phrase, wherein the intent specifies an activity to be performed via the computing device of the user;
identify at least a first application and a second application that are each capable of satisfying the intent, wherein identifying at least the first application and the second application is based on determining at least the first application and the second application are associated with the intent in one or more databases;
select the first application over the second application, wherein selecting the first application over the second application is based at least in part on recency of usage of the first application by the user for the activity specified by the intent, the usage being a past usage of the first application by the user for the activity specified by the intent, the past usage being prior to receiving the spoken utterance including the voice command trigger phrase, and
wherein the instructions to select the first application over the second application based at least in part on the recency of usage of the first application by the user further cause the at least one processor to determine that the first application was most recently selected, by the user, in response to receiving a prior spoken utterance including the voice command trigger phrase, the prior spoken utterance being received prior to receiving the spoken utterance including the voice command trigger phrase; and
provide, to the computing device of the user and responsive to the spoken utterance, an indication of the selected first application; and subsequent to providing the indication of the selected first application, and in response to receiving the spoken utterance, execute the first application to satisfy the intent without requiring any additional user input from the user, wherein the instructions to execute the selected first application to satisfy the intent comprise instructions to cause the selected first application to perform the activity specified by the intent.

* * * * *